Aug. 16, 1960  M. W. ALFORD ET AL  2,949,393
LAMINATES
Filed May 13, 1957
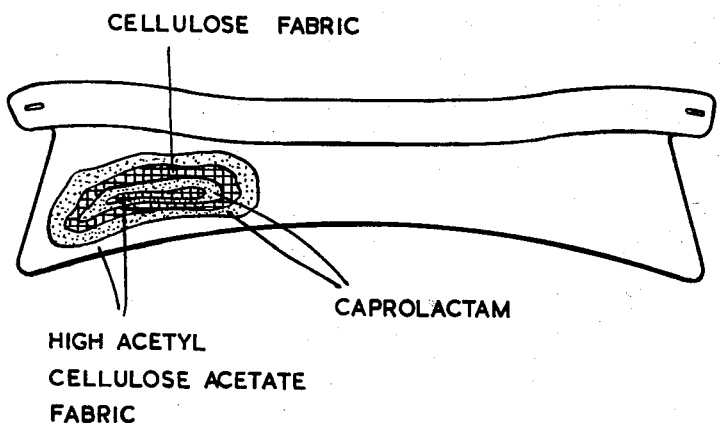

United States Patent Office 2,949,393
Patented Aug. 16, 1960.

2,949,393

LAMINATES

Maitland Walton Alford, Spondon, near Derby, and Arthur Richard Brearley, Chaddesden, England, assignors to British Celanese Limited, a company of Great Britain Filed May 13, 1957, Ser. No. 658,665

Claims priority, application Great Britain May 23, 1956

5 Claims. (Cl. 154—46)

This invention relates to laminates.

It is known to make flexible laminates by bonding a web having a basis of cellulose acetate to another web having a basis of an organic polymeric material, e.g. cellulose (including regenerated cellulose), cellulose acetate, or a synthetic fibre-forming polymer. In making such laminates the bonding is commonly effected with the aid of heat and pressure in the presence of a volatile organic liquid which exerts a solvent action on the cellulose acetate at the bonding temperature. Thus, for example, in one method of making semi-stiff collars that is largely practiced, an inter-lining fabric composed of or containing fibre of acetone-soluble cellulose acetate is sandwiched between two layers of cotton fabric and the layers are bonded together by a hot pressing operation carried out while the assembly is wet with a liquid, e.g. 80% aqueous alcohol, that develops solvent properties for the cellulose acetate at the pressing temperature. This use of a volatile organic liquid to assist bonding is a disadvantage of such processes. The present invention provides a process for bonding a cellulose acetate web to another web that has a basis of polymeric material which avoids the use of volatile organic liquids.

In the process of the invention the bonding is effected by the application of heat and pressure to the assembly of layers in the presence of cyclic amides of omega-amino-paraffinic-monocarboxylic acids. These amides are substances which are solid at ordinary temperatures and at temperatures between 20–200° C. melt to liquids of low volatility which, at suitably elevated temperatures below the melting point of the cellulose acetate, soften the latter to an extent which makes it adhere readily under pressure to webs of cellulose acetate or other polymeric materials that are wetted by the liquid cyclic amide. This effect is exerted by the cyclic amides not only on acetone-soluble cellulose acetates but on cellulose acetates of high acetyl value. (In this specification acetyl values are expressed throughout as percentages of combined acetic acid; "high-acetyl cellulose acetate" means cellulose acetate of acetyl value 59 to 62.5; "volatile" means more volatile than water; and the word "fibres" includes continuous filaments as well as staple fibres.) The fact that the process of the invention enables webs of high acetyl cellulose acetate to be bonded to webs of other polymeric material is an important advantage of the process. Even acetone-soluble cellulose acetates do not adhere readily to other polymeric materials and adhesion is even more difficult to effect in general with cellulose acetates of high acetyl value. It is of particular advantage to be able according to the invention to bond high acetyl cellulose acetate as well as cellulose acetate of lower acetyl value, e.g. 52 to 56% or 56 to 59%, to polymeric materials without the use of volatile organic liquids.

Thus the laminates of the present invention comprise a web of cellulose acetate fused to a web of an organic polymeric material, wherein there is present, at least in the interface between the webs, a cyclic amide of an omega-amino paraffinic monocarboxylic acid dissolved in the cellulose acetate.

Among cyclic amides that can be employed in carrying out the process of the invention, epsilon-caprolactam is of particular value. Among other cyclic amides that can be used mention may be made of gamma-butyrolactam and zeta-heptolactam. Although the use of these lactams, in which all the methylene groups of the ring are unsubstituted, is preferred, the use of ring-substituted lactams such as the mono- or di-methyl derivatives of any of the lactams specified, is not excluded.

The webs that are bonded together may be films, woven or knitted fabrics or fabrics of other construction, e.g. felted. Thus, for example, the invention includes making laminates from two or three layers of film or fabric, or from a layer of film and a layer of fabric, or from a layer of film or fabric sandwiched between two layers of film or between two layers of fabric, or from four or more webs of fabric and/or of film. The invention is of particular importance in making laminated fabric articles of apparel, especially semi-stiff collars. For such articles a three-layer assembly in which at least the outer layers are of fabric is most suitable. When an intermediate layer of film is employed in making such articles this is desirably perforated to assist moisture transmission.

As indicated above the invention is of particular advantage in bonding webs of high acetyl cellulose acetate (acetyl value 59 to 62.5%) to other webs. For semi-stiff articles of apparel, e.g. collars, laminates made according to the invention with two outer layers of woven fabric made of or containing high acetyl cellulose acetate fibre, with an intermediate layer of cotton or regenerated cellulose, are particularly attractive. Laminates of this construction have many other applications, e.g. for shirt cuffs, lapels, belts, corsets, brassieres and book and instrument covers. When the laminate is waterproof (as, for example, when it comprises at least one layer of imperforate film of waterproof material) other applications include portable fuel tanks, hoses and fabric for collapsible dingies and light aircraft.

Instead of cotton or regenerated cellulose, other fibre-forming polymeric material can form the basis of the web or webs to be bonded to the cellulose acetate web or webs. Such polymeric material is preferably one that can be subjected to the bonding temperature without substantial softening. Examples of such materials are: polyacrylonitrile and non-thermoplastic or high melting copolymers of acrylonitrile with other vinyl or vinylidene compounds, and high melting condensation polymers such as nylon 6, nylon 66 and polyethylene terephthalate.

Mixed fabrics can be used in the outer and/or inner layers of the laminates of the invention. Thus, for example, for the outer layers of a semi-stiff composite fabric we may employ fabrics interwoven from high acetyl cellulose acetate and any of the non-thermoplastic or high melting fibre-forming materials referred to above, or fabrics woven from mixed yarns containing two such components, e.g. yarns spun from high acetyl cellulose acetate fibre in admixture with regenerated cellulose staple fibre. Similarly, the interlining fabric in a three layer laminate may comprise yarns of a non-thermoplastic or high melting polymer in admixture with cellulose acetate or other thermoplastic fibre, or may be composed of mixed yarns containing two such components.

Although the most important application of this invention lies in bonding high acetyl cellulose acetate to material that does not undergo heat-softening or melting at the bonding temperature, the method is also applicable to bonding together two webs made of or containing cellulose acetate, one or both of which is preferably of high acetyl cellulose acetate. Similarly multi-layer laminates in which each layer contains cellulose acetate can be formed.

We have obtained good bonding by applying the cyclic amide in the form of a layer of powder between the surfaces to be bonded. Preferably, however, the amide is applied to one of the webs to be bonded together, in solution in a liquid, e.g. water, that does not affect that web, and the liquid is evaporated at a temperature below the melting point of the cyclic amide before bringing the coated web into contact with the web or webs with which it is to be bonded. Bonding may be effected by a hot pressing operation carried out dry in a multi-plate steam heated press; or the assembly of layers may be pressed in a damp condition and/or in a press so constructed that live steam comes into contact with the materials during pressing. The bonding can also be effected by an ironing operation using a dry iron or steam iron, or by passing the assembly between heated rolls. Temperatures between 140° and 210° C. have been found suitable according to the nature of the fabric that is bonded to the high acetyl cellulose acetate. When this is cellulose acetate of acetyl value 52 to 56% temperatures of 140 to 160° C. have been found suitable. When, on the other hand, a non-thermoplastic fabric is so used rather higher temperatures e.g. 180 to 210° C. are generally advisable. The pressure need be no greater than can be obtained using a hand iron, and exposure to the heat and pressure for 20–40 seconds is usually sufficient to secure effective bonding.

The following examples illustrate the invention:

*Example 1*

A plain woven cotton fabric of weight about 3 ounces/square yard was padded through a 50% aqueous solution of epsilon-caprolactam so that the fabric retained about 110% of its weight of the liquid. The fabric was dried at 50° C. From the dried fabric collar interlining blanks were cut.

Collar outer fabric blanks were cut from a fabric plain woven from cellulose acetate yarn of acetyl value 62% with 124 ends and 76 picks/inch. The fabric weighed about 3 ounces/square yard.

From the two kinds of blank three-layer collar assemblies were built up each with one layer of the coated cotton sandwiched between two layers of the cellulose acetate fabric. These were then pressed at 200° C. and 200 pounds/square inch for 20 seconds between the plates of a multi-plate steam heated press.

The collars so formed were then washed and reironed. The adhesion was excellent, the handle stiff but resilient. The collars did not rustle. The collars were apparently unaffected by boiling in water containing 1 gm. of soap/litre for 10 minutes.

*Example 2*

The process was as described in Example 1 except that: the interlining blanks were cut from an uncoated cotton fabric, these blanks were coated with the aqueous caprolactam solution by dipping in a bath, and were centrifuged to remove excess of the liquid and while still damp were inserted between the plies of cellulose acetate fabric forming the outer layers of the collar, and the bonding was effected by ironing at 180° C. for 30 seconds.

An unsuspected advantage of the process as described in the examples was that the safe ironing point of the cellulose triacetate was increased, in some cases up to 250° C. This increase in safe ironing temperature was accompanied by an increase in crystallinity of the high acetyl cellulose acetate as shown by the X-ray diagram.

*Example 3*

The process was carried out as in Example 1 except for the following difference: the interlining was cut from an interlining fabric of acetone soluble cellulose acetate (acetyl value 52 to 54%) which was impregnated with the caprolactam by soaking in a 60% solution thereof in industrial alcohol and was then dried; the bonding was effected at 160° C. under a pressure of ½ lb./sq. ft.

The collars so made withstood boiling soap solution without delamination or delustring.

The accompanying drawing shows a semi-stiff collar made according to the invention.

Having described our invention, what we desire to secure by Letters Patent is:

1. A laminate comprising three fabric layers, the two outer layers consisting of a fabric composed of cellulose triacetate yarns, the acetyl value being from 59 to 62.5 percent, and an interlining fabric, the layers being bonded together by means of a monomeric cyclic amide of an omega-amino paraffinic monocarboxylic acid at least part of which is dissolved in the cellulose triacetate.

2. A laminate comprising three fabric layers, the two outer layers consisting of a fabric composed of cellulose triacetate yarns, the acetyl value being from 59 to 62.5 percent, and an interlining fabric, the layers being bonded together by means of epsilon-caprolactam at least part of which is dissolved in the cellulose triacetate.

3. A laminate as claimed in claim 2 wherein the interlining fabric is composed of cotton.

4. A laminate as claimed in claim 2 wherein the interlining fabric is composed of secondary cellulose acetate fibres the acetyl value of which is from 52 to 56 percent.

5. A laminate as claimed in claim 2 wherein the interlining fabric is composed of regenerated cellulose fibres.

References Cited in the file of this patent

UNITED STATES PATENTS

| | | |
|---|---|---|
| 2,268,616 | Peters | Jan. 6, 1942 |
| 2,269,125 | Quenelle et al. | Jan. 6, 1942 |
| 2,614,954 | Ewing et al. | Oct. 21, 1952 |